(No Model.)

G. R. HOWELL.
LEMON SQUEEZER.

No. 598,150. Patented Feb. 1, 1898.

WITNESSES:
C. Nordyou
C. Gersh

INVENTOR
George R. Howell.
BY Edgar Tate & Co
ATTORNEYS.

THE NORRIS PETERS CO., PHOTO-LITHO., WASHINGTON, D. C.

UNITED STATES PATENT OFFICE.

GEORGE REEVES HOWELL, OF SOUTHAMPTON, NEW YORK.

LEMON-SQUEEZER.

SPECIFICATION forming part of Letters Patent No. 598,150, dated February 1, 1898.

Application filed May 11, 1897. Serial No. 635,976. (No model.)

*To all whom it may concern:*

Be it known that I, GEORGE REEVES HOWELL, a citizen of the United States, residing at Southampton, in the county of Suffolk and State of New York, have invented certain new and useful Improvements in Devices for Extracting the Juice of Lemons and other Fruits, of which the following is a full and complete specification, such as will enable those skilled in the art to which it appertains to make and use the same.

This invention relates to devices for extracting the juice of lemons and other fruits; and the object thereof is to provide an improved device of this class which is simple in construction and operation and also comparatively inexpensive.

The invention is fully disclosed in the following specification, of which the accompanying drawings form a part, in which—

Figure 1:
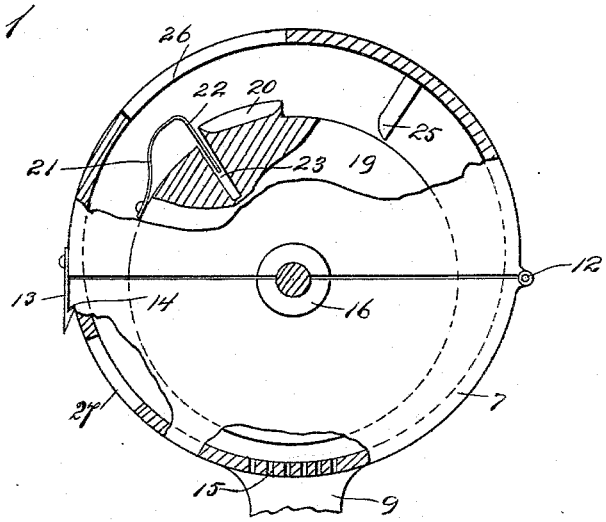
Figure 2:
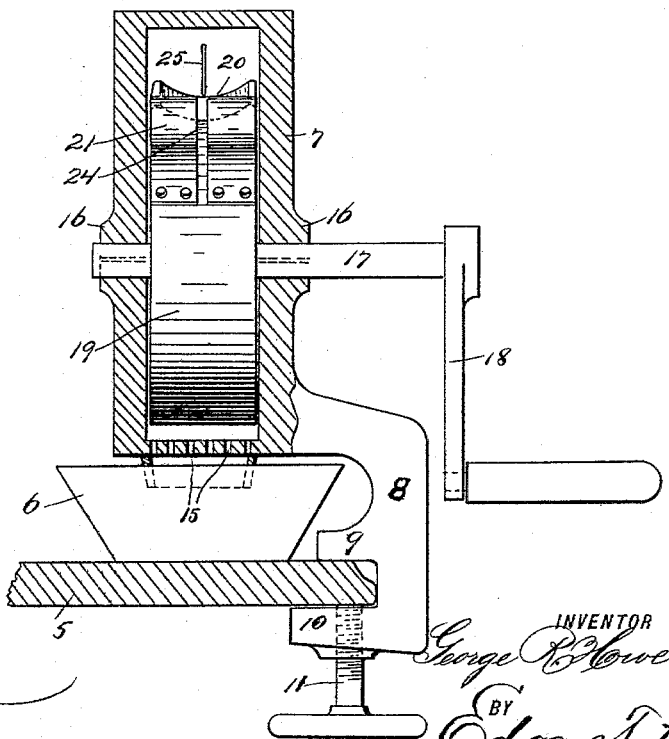

Figure 1 is a sectional side view of my improved lemon-juice extractor, and Fig. 2 a sectional view at right angles to that of Fig. 1 and showing means for securing the extractor to a table or other support.

In the drawings forming part of this specification the separate parts of my improvement are designated by the same numerals of reference in each of the views, and in said drawings, reference being made to Fig. 2, I have shown at 5 a part of a table or other support on which is placed a bowl or other vessel 6, and in the practice of my invention I provide a device of the class herein specified, which consists of a circular casing 7, which is provided with an arm 8, which is provided with parallel jaws 9 and 10, and the lower jaw 10 is provided with a set-screw 11, by means of which the device may be secured to a table or other support.

The circular casing 7 is composed of two parts, hinged together at 12, and the upper part is provided with a spring-catch 13 at the opposite side thereof, which is adapted to engage with a shoulder or projection 14, formed on the lower part, so as to hold said parts in connection, and the upper part of said casing is larger than the lower part, and passing through said casing and through bearings 16, formed partly in the upper and partly in the lower part, is a shaft 17, provided with a crank 18, and mounted on the shaft 17 within the casing 7 is a cylinder or drum 19, which is provided at one side with a cup-shaped receptacle 20, and secured to said cylinder or drum at one side of said cup-shaped receptacle 20 is a plate-spring 21, which is curved upwardly and in the direction of said cup-shaped receptacle and provided with an inwardly-directed extension 22, which enters a transverse slot 23, formed in said cylinder or drum, and the said plate-spring is preferably composed of two parts, between which is a narrow space 24, or said spring may consist of a single piece and be provided with a central longitudinal slot, and secured to the perimeter of the casing 7 and at one side of the upper portion thereof is an inwardly-directed blade 25. The upper part or perimeter of the casing 7 is also provided with an opening 26, and it will be observed that by reason of the fact that the upper part of said casing is larger than the lower part the drum or cylinder 19 is arranged eccentrically thereof, said drum or cylinder approaching much closer to the bottom of said casing than it does to the top thereof. The lower part of the casing 7 is also provided with an opening 27, which is situated to the left of the perforated bottom, and the operation will be readily understood from the foregoing description when taken in connection with the accompanying drawings and the following statement thereof.

In practice the cylinder or drum 19 is turned so that the cup-shaped receptacle 20 will appear directly under the opening 26, and a lemon or other fruit the juice of which is to be extracted is passed through said opening into said cup-shaped receptacle. The drum or cylinder 19 is then turned to the right, and the lemon or other fruit is carried around therethrough, being prevented from moving backwardly by the spring 21, and the blade 25 passes through said lemon or other fruit and divides the same, and as the cylinder or drum is turned the separate parts are carried downwardly between the bottom of the cylinder or drum and the bottom of the casing 7, and the juice is extracted therefrom and passes through the perforations 15 into the vessel or receptacle 6, and as said cylinder continues to revolve the pulp and rind of the lemon will be carried around and discharged through the opening 27.

This device is simple in construction and operation and well adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A device for extracting the juice of lemons or other fruit, comprising a circular casing composed of two parts, the upper part being larger than the lower part, a shaft passing through said casing centrally of the meeting-point of said parts, a cylinder or drum mounted on said shaft within said casing, and the upper part of said casing being provided with an opening and the lower part being perforated, said casing being also provided at one side of the opening in the top thereof with an inwardly-directed blade, and said drum being provided with a receptacle for holding the lemon, and with a slotted spring which is secured thereto, at one side of said receptacle, substantially as shown and described.

2. The herein-described device for extracting the juice of lemons, comprising a casing 7, having means for securing it to a table, said casing being composed of hinged parts adapted to be secured together, the upper part of said casing being larger than the lower part, a shaft 17 mounted in bearings 16, and provided with a crank 18, a cylinder or drum 19 mounted on said shaft provided at one side with a cup-shaped receptacle 20, adapted to hold a lemon, a plate-spring 21, secured to said cylinder and located at one side of said cup-shaped receptacle, said spring being curved inwardly in the direction of the said cup-shaped receptacle, and provided with an inwardly-directed extension 22, adapted to enter a transverse slot 23, formed in said cylinder or drum, the said plate-spring being composed of two parts forming a space between them to permit a blade 25 to pass therebetween, said casing being also provided with an opening at its upper and lower side, substantially as and for the purpose described.

In testimony that I claim the foregoing as my invention I have signed my name, in presence of the subscribing witnesses, this 6th day of May, 1897.

GEORGE REEVES HOWELL.

Witnesses:
ANNA L. MORRELL,
P. JOSEPH HURLEY.